United States Patent [19]
Rosendahl

[11] Patent Number: 5,521,838
[45] Date of Patent: May 28, 1996

[54] POWER SUPPLY

[76] Inventor: Glenn Rosendahl, 507 Century Street, Winnipeg Manitoba, Canada, R3H 0L8

[21] Appl. No.: 199,958

[22] Filed: Feb. 22, 1994

[51] Int. Cl.⁶ ........................................................ H02J 3/00
[52] U.S. Cl. ............................................. 364/492; 307/35
[58] Field of Search ......................... 307/35; 340/825.22; 364/140, 492, 493

[56] References Cited

U.S. PATENT DOCUMENTS

| | | | |
|---|---|---|---|
| 4,418,333 | 11/1983 | Schwarzbach et al. | 340/825.22 X |
| 4,499,385 | 2/1985 | Slavik | 307/35 X |
| 4,694,192 | 9/1987 | Payne et al. | 364/492 X |
| 5,222,011 | 6/1993 | Braun | 361/154 |

*Primary Examiner*—Edward R. Cosimano
*Attorney, Agent, or Firm*—Adrian D. Battison; Murray E. Thrift

[57] ABSTRACT

A micro processor controlled system is provided for supplying electrical power to a plurality of electrical outlets for example for use in a parking lot. A central power supply communicates with a series of outlet receptacles each arranged to supply electrical power. Each receptacle has its own micro processor controlled control unit which is arranged to control the supply of power to the receptacle. A detector unit detects the insertion of a connector plug to the receptacle and actuates a comparator which compares the instantaneous current drawn by the load with a predetermined variable maximum current and allows that current to be drawn only if it is less than the maximum. In the event that the maximum is exceeded, the load is disconnected and is only allowed to be reconnected after the connector plug is removed. A thermostat can be used to control the supply of power depending upon the outside temperature. The micro processors can select a part only of a cycle for supplying power so that the total power drawn by the central power supply is reduced.

21 Claims, 8 Drawing Sheets

POWER SUPPLY

This invention relates to an apparatus for supplying electrical power to a number of separate outlets.

BACKGROUND OF THE INVENTION

In colder regions of the globe electrical devices are used to heat automobile engines and interiors to facilitate engine starting and user comfort. Energy costs and conservation efforts have led to the widespread use of parking lot controls. These controls are designed to reduce energy consumption while still satisfying engine starting and user comfort constraints. Numerous algorithms have been devised to limit this consumption, ranging from simple timers to the most current proportional temperature controls (the colder it gets the more power is delivered).

Current parking lot controls are centralized, whereby all the loads of a parking lot are switched together on or off by a central contactor. Many inherent restrictions and limitations are imposed by this form of centralized control. Central contactor controls carry substantial installation and maintenance costs, with typical installation pay back periods in the order of five years or more. The longevity of mechanical contactors depend heavily on regular maintenance adding to operational costs.

Many lots impose a limit on power use for each vehicle. But since no adequate means of enforcement exists, it is left open to abuse. Often enough users abuse the set limits to trip the main breaker for a lot, inconveniencing all patrons. In addition, individual parking stall breakers are tripped due to temporary short circuits, overloads, etc. Since no feedback as to the presence of power is provided for users or maintenance personnel, this stall maybe without power for several days.

It is one object of the present invention to provide an improved apparatus for controlling and monitoring electrical automobile heating loads for the purpose of energy conservation. Redistributing control of parking lot electrical loads to each parking stall has major advantages over centralized control schemes. Capital costs of implementation are drastically reduced to pay back periods in the order of one year. This is due in part to the elimination of the central high current contactors and their associated wiring. Other gains are realized through better demand management control, energy conservation algorithms and user service as well as lower maintenance costs.

By fitting each outlet box (which controls two stalls) of a parking lot with a reprogramable microcontroller greater flexibility is realized. This increases the diversity of possible energy conservation algorithms that can be implemented. Helping management staff to meet patron requirements, maximize energy conservation and meet ever increasing budgetary constraints. Further, conservation algorithms can be updated, customized, or changed as new techniques become available since the device is reprogramable. Apparatus for the measurement of temperature or wind-chill is also provided enabling the most current conservation algorithms to be implemented.

One novel feature included is the ability to detect each load as it is asserted or removed. This enables the device to delay delivery of power to a newly asserted load for sometime. Reasoning that the vehicle has just arrived, it is still warm and should be for sometime. The length of this delay could be a fixed amount of time or calculated based on current temperature, wind-chill, etc. This feature may also assist local utilities with peak power demand management. Peak demand periods occur between 8 and 9 a.m., when people arrive at work and again 5 to 6 p.m., when people return home. The burden of these automobile heating loads maybe averted during these times with this new technique.

By including apparatus for sensing current being delivered to each load another dimension in control is added. This enables the effective enforcement of power consumption limits for each vehicle, assisting in local demand power management. Maintenance costs are reduced and user service is increased by the detection of overloads or short circuits. Enabling these loads to be switched "off" before the associated breaker can trip. Added safety is provided by helping to prevent faulty loads from starting fires or damaging property. This apparatus enables the use of economical solid-state contactors for delivering power to attached loads, reducing maintenance costs and boosting reliability.

Feedback to patrons is provided by visual or auditory apparatus. In the case of visual feedback two light emitting diodes (LED's) are provided, one green the other red for each stall. As an example, when a user asserts a load the presence of power is identified by a quick flash of the green LED (load within acceptable limits) or the red LED is lit solidly (overload is rejected). For auditory feedback different tones identify load acceptance or rejection and the presence of power.

A bi-directional infrared data communication interface is included increasing utility. From time to time general maintenance of parking lots are performed requiring power tools. To facilitate this whole parking lots are disabled with centralized controls. While with the present invention only required individual outlets need be disabled. With this data link operational modes and limits can be easily set and changed. Since this link is bi-directional the device can be used to collect operational data to be down loaded periodically at request. Providing management and maintenance with such diverse information as frequency of use, number of overloads and short circuits seen, amount of power delivered, temperature trends, etc. This information may then be used to help design better energy conservation algorithms and maintenance schedules.

An interface is provided to allow the microcontrollers program or firmware to be changed, making it field programmable. This increases the useful life and reduces manufacture costs. Useful life is increased by the fact the energy conservation algorithms can be kept up to date and customized to a particular application. Manufacturing costs are reduced by having to produce only one generic model. And by reprogramming the devices with self test and calibration routines, manufacture costs are further reduced.

One embodiment of the invention will now be described in conjunction with the accompanying drawings in which:

DETAILED DESCRIPTION

Figure 7:
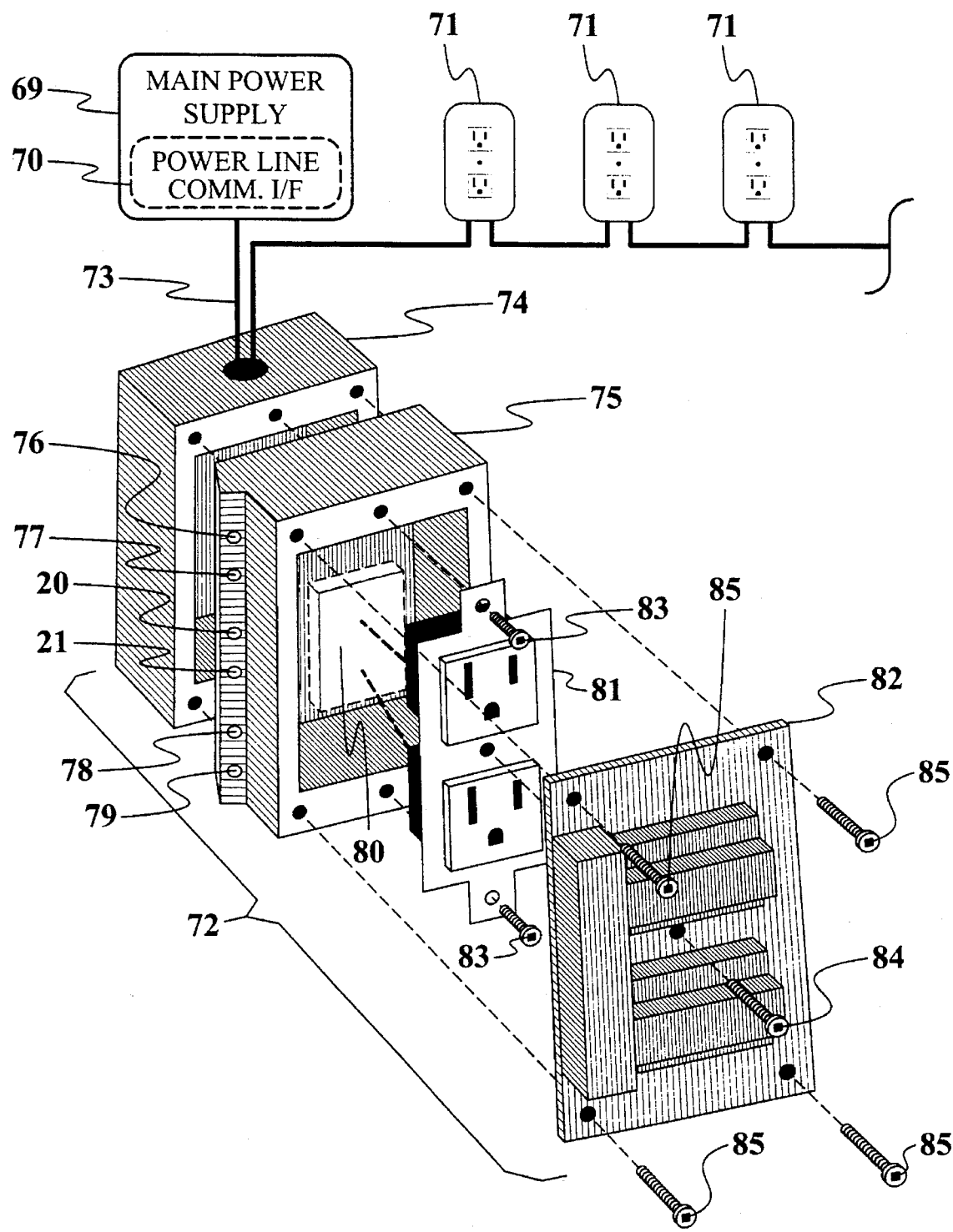
FIG. 7 is a schematic illustration of a control system for supplying electrical power to a plurality of electrical outlets in a parking lot.

In FIG. 7 is shown an overview of the whole system which includes a main power supply 69 for supplying electrical power to a plurality of outlets 71, most of which are shown only schematically but one of which indicated at 72 is shown in an exploded isometric view. The electrical power is supplied through wiring 73 which is again shown only schematically without distinguishing between the hot, neutral or ground wires.

The main power supply comprises basically only a main breaker and possibly a number of subsidiary breakers to a number of different circuits depending upon the number of outlets to be supplied.

It is a conventional practice to provide the outlet as paired outlets with each pair within a separate receptacle mounted at a spaced position around the car park to be supplied. The one outlet illustrated in detail therefore comprises a metal box or receptacle 74 which is mounted on a suitable support for example of wooden post, fencing or the like. The receptacle 74 has an open front face which can receive a rectangular extension box module 75 which in turn carries a standard duplex outlet 81 and cover plate 82. The extension box module is fastened in place by a conventional screw arrangement 85 which connects with screw holes supplied on the receptacle 75. The standard outlet 81 is fastened to the receptacle 74 through holes provided by the extension box module 75 in a standard arrangement by screws 83. The standard cover plate 82 is fastened by screws 85 and/or 84. A suitable gasket or other sealing arrangement can be provided to prevent moisture penetration but this is not illustrated as it is well known to one skilled in the art.

The extension box module 75 contains a control unit 80 which enables the independent control of each outlet of an attached duplex outlet 81. A conventional electrical terminal arrangement is provided on the rear face of the extension box module 75 so as to be insertable into the receptacle 74 for electrical supply connection, protection, and containment thereby. Wires are provided within the open front face of the extension box module 75 so as to enable the standard connection of a standard duplex outlet 81.

The control of the power supply to each outlet is effected by the control unit 80 contained within the extension box module 75, without the necessity for any central control intelligence. In this way the system can be implemented into existing receptacles and wiring simply by inserting the extension box module 75 between the conventional outlet 81 cover plate 82 and the supply receptacle 74. This allows installation at a relatively inexpensive price. In addition individual programming of the outlets can be provided.

On the side facing forward of the extension box module is also shown a first LED 76,79 which is green for indicating normal or proper operation of the power supply after application of a load. A second LED indicated at 77,78 is red and this is used to indicate an unacceptable load as described hereinafter. Further ports 20 and 21 are provided for bi-directional communication as again described hereinafter.

Figure 1:
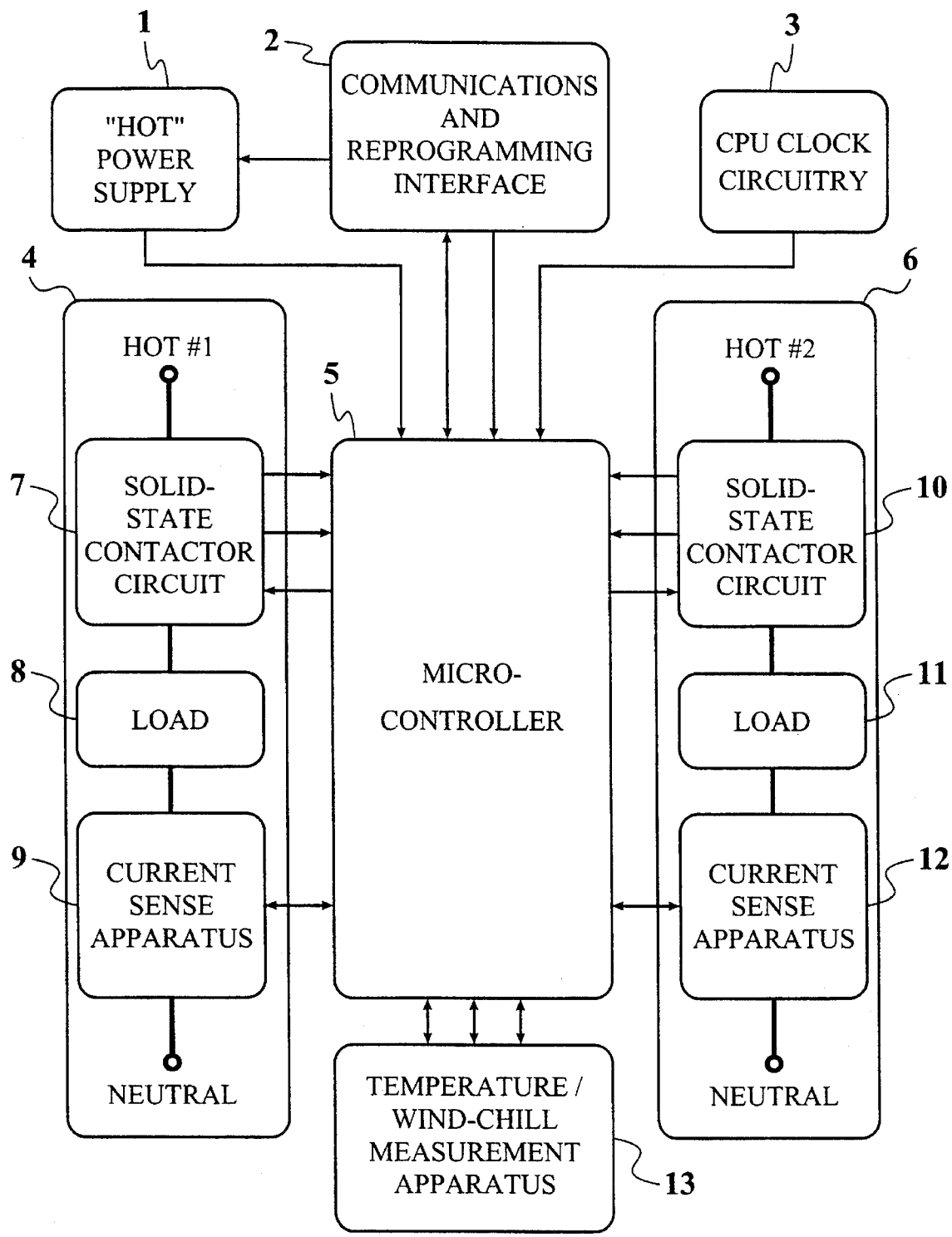
FIG. 1: Overall Block Diagram of Circuit

An overall block diagram of the circuit is shown in FIG. 1. The "Hot" power supply 1 supplies all the required power for normal operation of the device. Communication and reprogramming features are supplied by the infrared communications and reprogramming interface 2. The system operation clock for the microcontroller 5 is provided by the CPU clock circuitry 3. The microcontroller 5 controls both outlets of a dual outlet receptacle through the outlet interfaces 4 and 6. Each outlet interface is identical in construction composed of solid-state contactor circuits (7 and 10), a standard outlet where electrical loads may be attached (8 and 11) and current sense apparatus (9 and 12). The temperature/wind-chill measurement apparatus 13 enables the microcontroller 5 to measure the ambient temperature or wind-chill. Together these circuits provide a novel and particularly useful function for the purpose of energy conservation.

Figure 2:
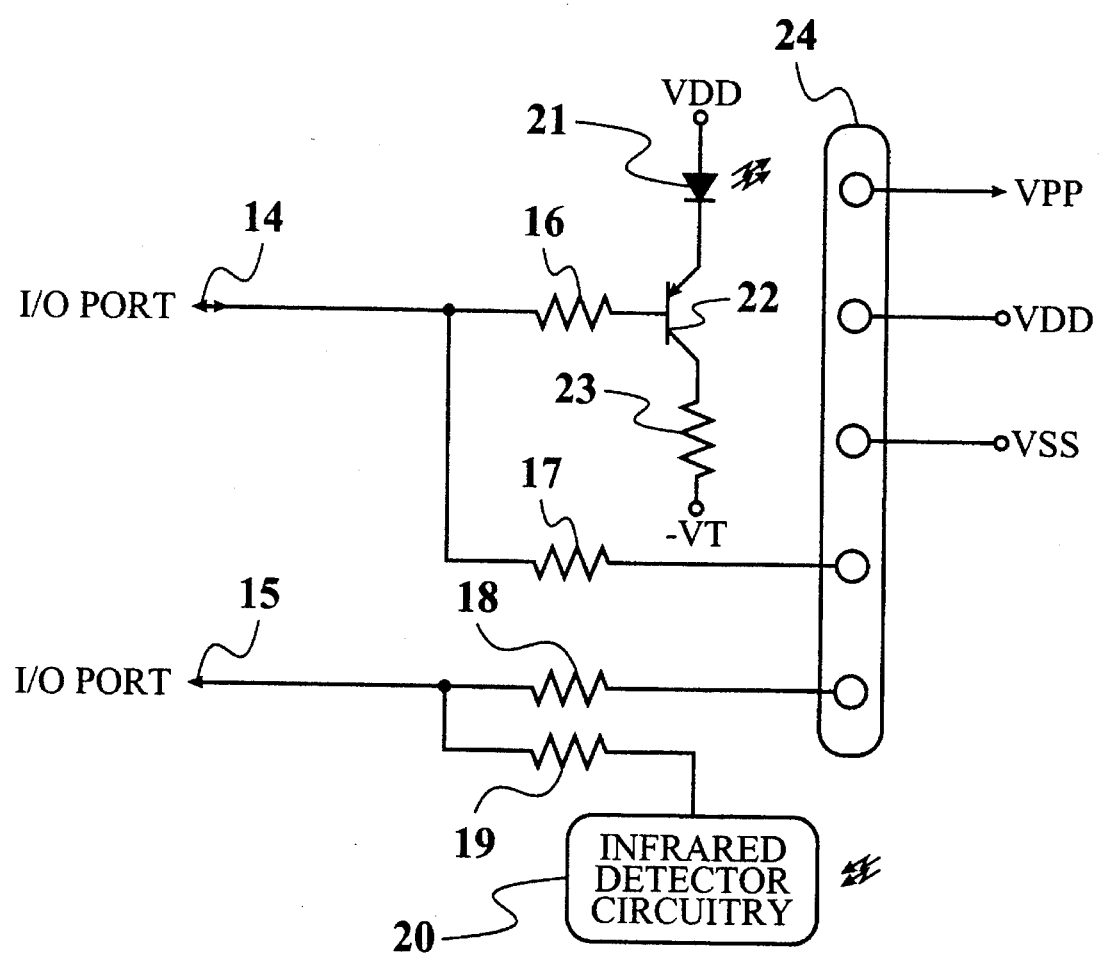
FIG. 2: Infrared Communication and programming Interface

The bi-directional Infrared communication and reprogramming interface is shown in FIG. 2. This figure shows one possible communications link to the external world via an infrared data link. The infrared data link is similar to those found in televisions and VCR recorders with the exception that this is bi-directional. Points 14 and 15 are connected to two separate I/O ports of the microcontroller. The I/O port connected to point 14 controls the infrared emitting diode 21 through resistor 16, transistor 22 and resistor 23. This circuit allows the device to communicate with maintenance personnel via infrared light. The I/O port connected to point 15 is always configured as an input. Configuration and control information is passed to the device through the infrared detector circuitry 20 (such as Sharp model IS1U60 infrared receiver), resistor 19 and point 15 to the I/O port. With this infrared link maintenance personnel can communicate configuration, control, and retrieve collected information. It is through this interface that most data will be communicated. One other interface is provided via the five pin connector 24. This interface is primarily used to reprogram the microcontroller for entirely different energy conservation algorithms or applications. Connector 24 interfaces with the microcontroller through Vpp (the programming voltage pin of the microcontroller), Vdd (the plus power supply to the microcontroller), Vss (the ground or return supply to the microcontroller), I/O ports connected to points 14 and 15 via resistors 17 and 18 respectively. Other communication methods are also suitable such as power line carrier technologies.

Figure 3:
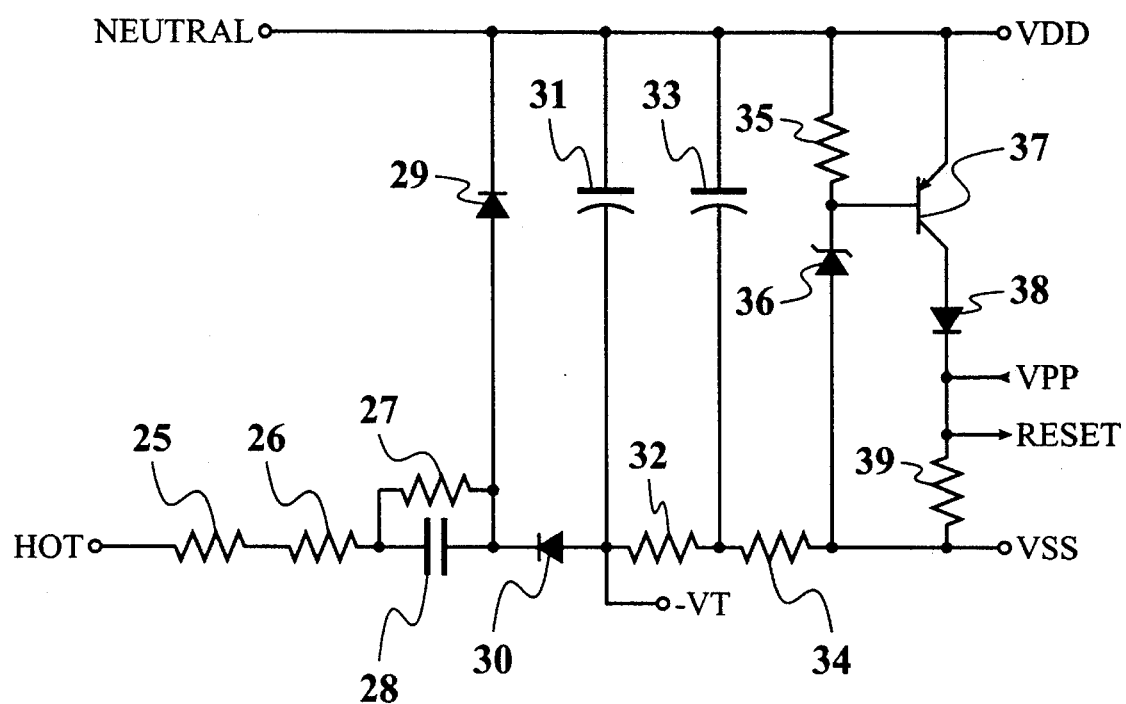
FIG. 3: "Hot" Power Supply Circuitry

The "Hot" power supply circuitry is shown in FIG. 3. This circuit provides all the necessary power needed for normal operation of the device. The word "Hot" is to imply that the circuit derives the energy required directly from the AC power line without using a transformer. The Neutral line is connected directly to the plus Vdd supply of the circuit. Current is "pumped" into the power supply on the negative slope of the Hot terminal with respect to the Neutral terminal through diode 30. The positive slope current is returned to the AC supply through diode 29. The AC supply current is limited by resistors 25, 26 and capacitor 28. Resistors 25 and 26 are relatively small in value and are used to limit the surge current through capacitor 28. In the event of AC power being removed resistor 27 discharges any residual charge left on capacitor 28 as a safety precaution. This pump current charges capacitors 31 and 33 through diode 30 for capacitor 31 and diode 30 and resistor 32 for capacitor 33. The negative trigger supply voltage (−VT) is supplied by the charge across capacitor 31. Resistor 32 and capacitor 33 form a low pass filter reducing voltage ripple across capacitor 33. The charge voltage on capacitor 33 is supplied to the voltage regulator circuit made of resistor 35, transistor 37, zener diode 36 and resistor 34. The combination of the zener diode 36 and the base-emitter junction of the transistor 34 sets the voltage between the Vdd and Vss (or ground) terminals. This value is specified by the zener diode 36 plus 0.7 volts for the base-emitter junction of transistor 37. The voltage on capacitor 33 must be greater than this regulation value with the remaining voltage dropped across resistor 34 in order to activate the regulator. The collector terminal of transistor 37 provides a reset signal for the microcontroller through diode 38 and across resistor 39. If the voltage across capacitor 33 is insufficient to drive the regulation circuitry transistor 37 is off. Hence, no current will flow through transistor 37, diode 38 and resistor 39. No, voltage will be dropped across resistor 39 and the voltage at the reset terminal will be low holding the microcontroller in reset. This ensures that the microcontroller will be in a predefined state even during brown-out conditions of the AC power line. The reset pin of the microcontroller doubles as the programming supply voltage (VPP) pin. VPP is typically much greater than VDD with respect to VSS, hence diode 38 is provided to block this programming voltage from interfering with the regulation circuitry. This voltage is supplied from the interface connector 24 of FIG. 2.

Figure 4:
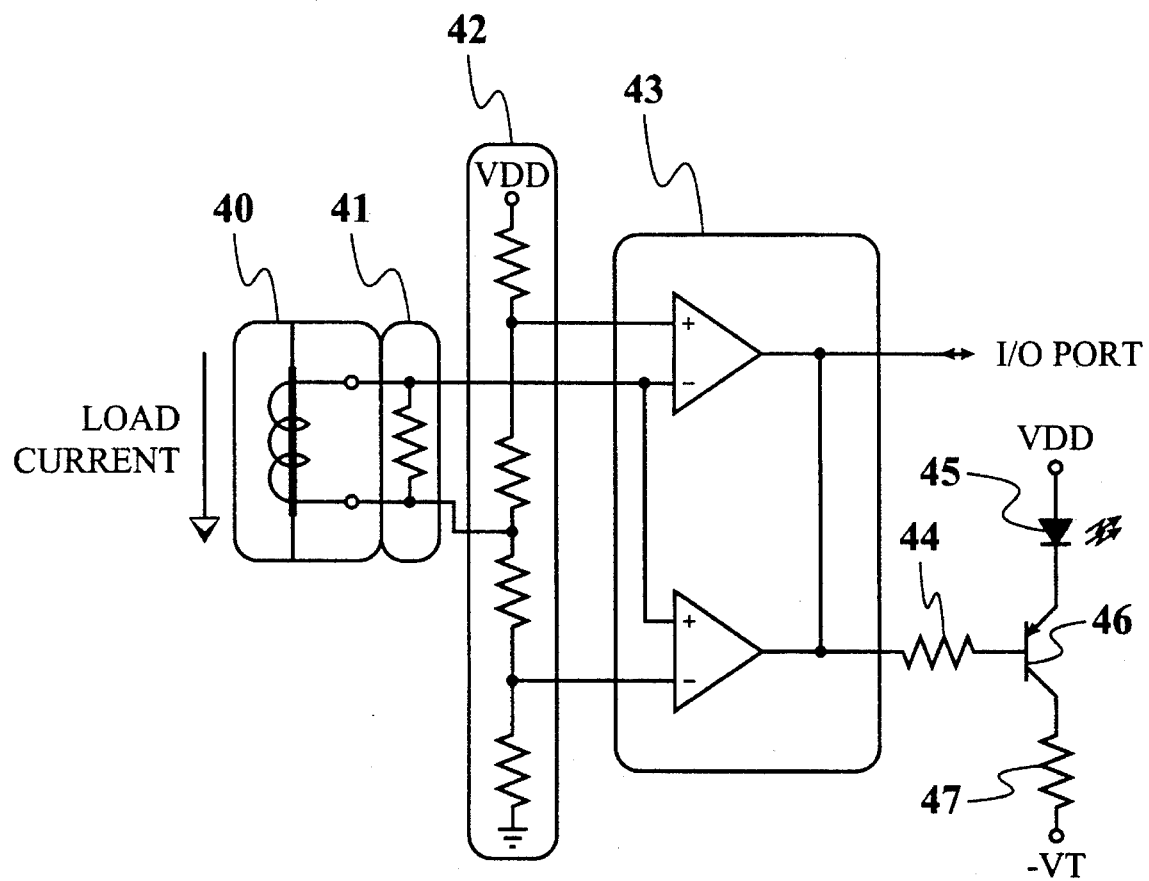
FIG. 4: Current Sense Apparatus

The Current Sense Apparatus is shown in FIG. 4. Current transformer 40 provides a current proportional to the current delivered to the load. By placing a resistive burden 41 across the current transformer output terminals the proportional current signal is converted to a proportional voltage signal. This sense voltage is processed by a window comparator 43 and voltage divider network 42. The window comparator provides a digital output which is either "low" or "high" depending if the load current sensed is "over" or "under" a set current limit respectively.

Figure 8:
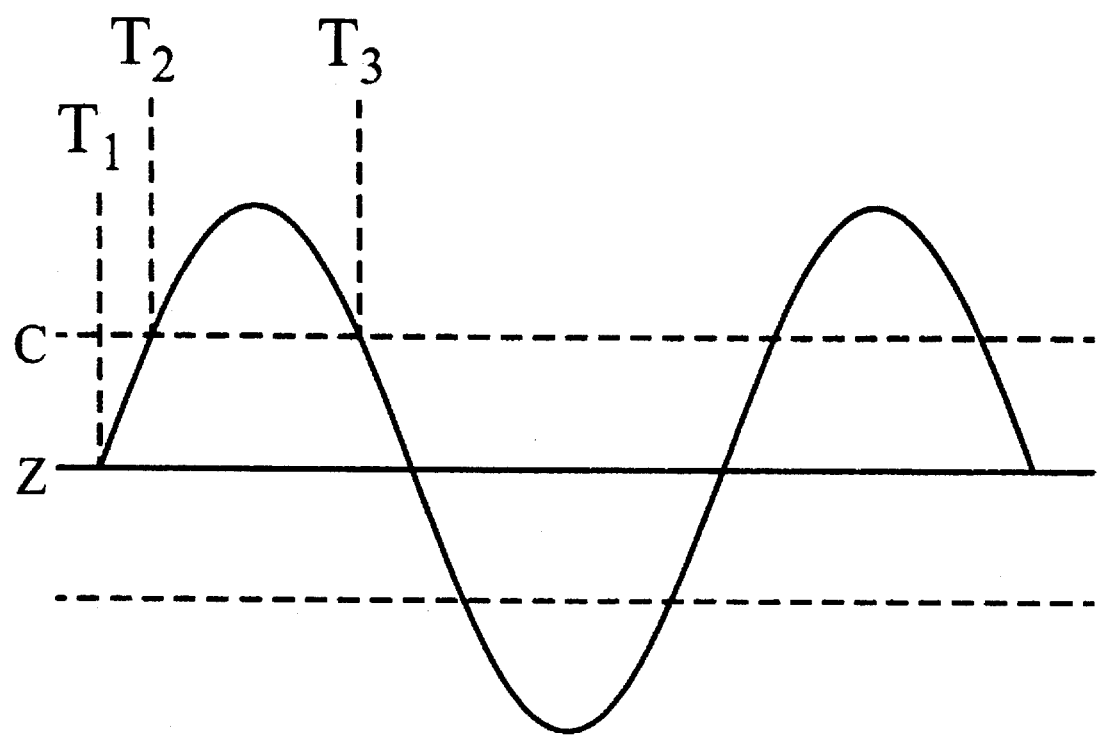
FIG. 8 is a diagram showing the operation of the current sense apparatus of FIG. 4.

The operation of the window comparator is illustrated in FIG. 8 where the set current is indicated at C. As explained hereinafter, the microprocessor has an input providing information on power line zero crossings as indicated at Z so that it has information on the point $T_1$ as shown. The window comparator therefore provides state changes at points $T_2$ and $T_3$ which occur at the times where the sensed current becomes greater than the set current and subsequently at $T_3$ becomes less than the set current.

The set current limit detected by the window comparator is determined by the voltage divider network 42. The window comparator output is connected to one of the microcontrollers digital input/output ports. The set current limit should be chosen to be the smallest peak load current required to be detected for an application. Then by simply timing the window comparators output "low" pulse-width, currents over the set current limit can be measured with good resolution. This gives greater flexibility to the device by allowing overcurrents for an application to be set within software and not hardware. The comparison of the current supplied with a predetermined current is thus effected for each half cycle. The measurement of the current is effected by detecting the differences in time between events $T_1$ and $T_2$ or between the events $T_2$ and $T_3$. It will be appreciated that for larger currents the time period between $T_1$ and $T_2$ will be reduced while the time period between events $T_2$ and $T_3$ will be increased. The microprocessor thus detects one or both of these time periods and compares this with a software table giving a calculation of the actual current drawn in relation to variations in the time periods. The microprocessor can then be programmed with the required predetermined maximum current. This predetermined maximum current can thus be set in software and can be readily varied by the communication system described herein before. For example, therefore, the predetermined maximum current can be set at a current which will provide power to only an engine block heater so that any additional current drawn above this amount will trigger the microprocessor to disconnect supply as described hereinafter. If required for custom application, the predetermined maximum current can be increased to allow one or more outlets within the parking lot to allow an increased current for example to drive an interior vehicle warmer. Temporarily the microprocessor can be programmed to yet further increase the maximum allowable current for example for power tools and the like.

In the event that an overcurrent is detected, the microprocessor determines the degree of overcurrent. In the event that the overcurrent is very large indicating a short circuit, the microprocessor disconnects supply and prevents reconnection of supply until the load is disconnected and a new "load applied". It is of course possible for the load to go short circuit during operation and accordingly it is necessary to detect this possibility and then to prevent any further connection which would otherwise cause damage to the control unit.

In the event that the overcurrent is beyond the predetermined maximum but less than that indicative of a short circuit, the microprocessor is arranged to continue to supply power for a predetermined number of further detection cycles to ensure that the overcurrent is not simply a resultant for example a switching within the load which only temporarily provides an overcurrent.

The window comparator 43 output is of the open collector type. This enables the I/O Port to become an output to drive the red indicator LED 45 through resistor 44, transistor 46, and resistor 47, providing a means of visual feedback to users and maintenance personnel.

This current sensing apparatus enables the device to enforce load limitations on users, prevent short circuits or overloads from tripping breakers, use economical solid-state contactors and helps to increase user safety.

Other methods for measuring current are also suitable such as the use of an Analog to Digital converter (ADC). This method simplifies the needed software but increases hardware costs. The method presented is meant to describe only one possible method of very many, which is apparent to one skilled in the art.

Figure 5:
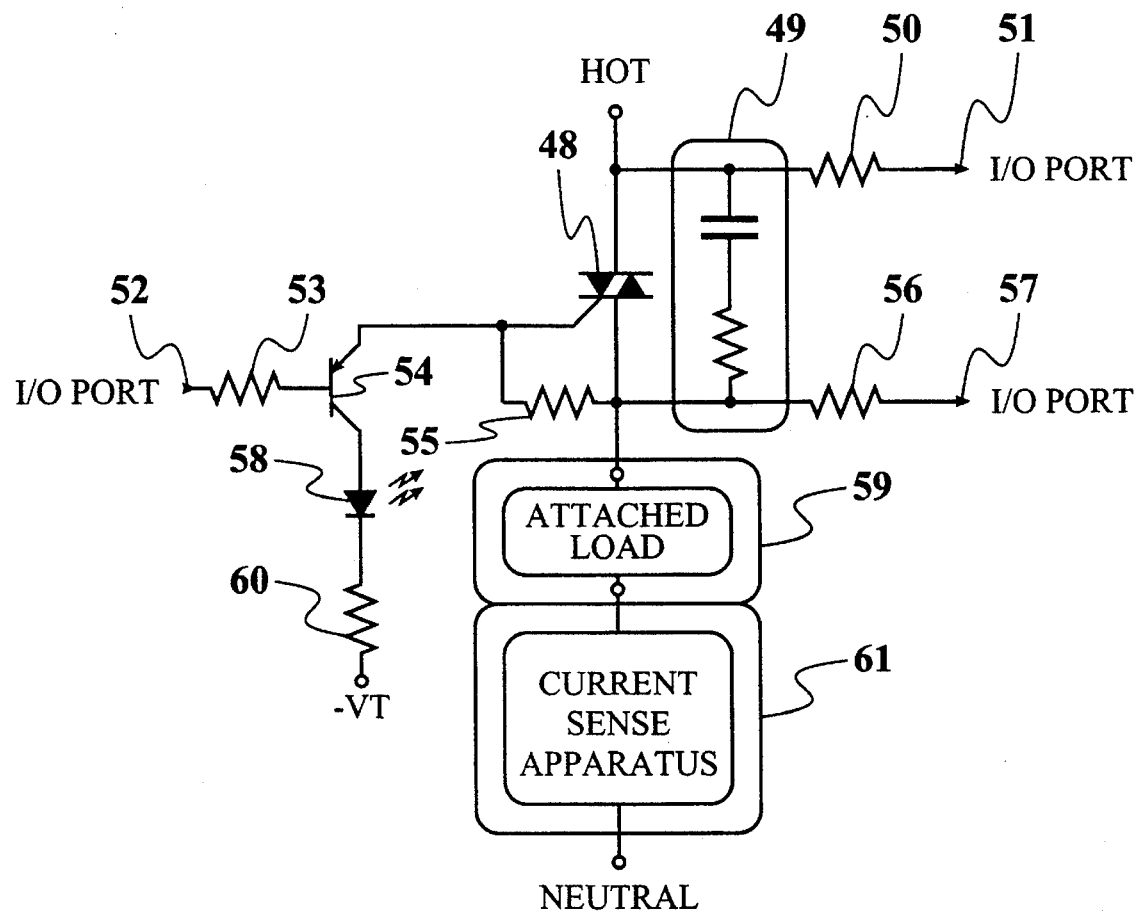
FIG. 5: solid-state Contactor Circuitry

The solid-state contactor and load detection circuitry is shown in FIG. 5. Solid-state contactor 48 provides the means to deliver power to attached loads 59. The snubber network 49 prevents false triggering of the solid state contactor when in the presence of inductive loads. While resistor 55 prevents false triggering due to static discharge, etc. Voltage zero crossings of the power line are provided in digital form at point 51 to an input/output port of the microcontroller. Resistor 50 is used in conjunction with the protection diodes of the microcontrollers I/O port to shape this analog signal into a digital one. This information is used to derive a real time clock and determine when the contactor should be triggered. To achieve radio frequency interference free power delivery the contactor should be triggered "on" at power line zero crossings only.

Point 57 is used to detect if loads are attached. In order to determine this, the contactor must be in the "off" or high impedance state. If no load is attached the voltage at point 10 will follow the value of the "Hot" terminal through snubber network 49 and resistor 56 and is clamped to a digital signal by the I/O port protection diodes. Otherwise, if a load is attached the voltage at point 57 is tied to neutral through the attached load 59, current sense apparatus 61 and resistor 56. Then by monitoring point 57, if its level remains unchanged throughout the course of a full cycle of the power line a load is attached, otherwise no load is connected.

The microcontroller triggers the solid-state contactor 48 through the I/O port connected to point 52. When a "low"

output pulse is applied to point 52 the triac 48 will enter its low impedance state or turn "on". This trigger current is supplied to the triac 48 through resistor 53, transistor 54, green LED 58 and resistor 60 to the negative trigger supply voltage (−VT). During this trigger pulse the green LED 58 will be lit providing visual feedback to the user. The user will therefore see on inserting the connector plug and applying the load a flash of the green LED also shown in FIG. 7 (76,79).

The detection of the allowable current as described above is effected each half cycle and the triggering of the contactors is effected on each zero crossing to maintain control over the power supply.

Solid state contactors can be damaged by excessive currents such as those associated with short circuits. It is most probable that a load if short circuit will be short circuit when it is first applied to the system. As explained above, therefore, the microprocessor is arranged to detect the presence of a new load by continually monitoring the presence or absence of a load. In the event that a detected absence of a load is followed by a detected presence of a load, the microprocessor is arranged to firstly provide a test of that load to determine whether it is short circuit. This is effected by triggering the contactor instead of at a zero crossing at a position close to the next zero crossing at which time it will shut off. The amount of current thus supplied to the load is controlled in that the voltage at the point of triggering is relatively low in comparison with the peak voltage. The resulting load current is then monitored by the current sense apparatus of FIG. 4, to ensure that the current sense apparatus does not detect a current over the set current limit. If a current over the set limit is detected despite the reduced voltage, the attached load is deemed to be a short circuit. The microprocessor is arranged to ensure that the contactor will not be triggered again until this load is removed and a new load is asserted. By following this simple load qualification scheme solid-state contactors are used reliably.

The load detection feature can also be used to increase power conservation by the fact we know when a new load is attached. Reasoning that the vehicle has just arrived, it is still warm and should be for sometime. We can then delay the delivery of power to this new load for sometime. The amount of wait time can be determined by the current temperature, wind-chill, etc. This feature is also beneficial to local utilities in managing peak demand periods.

Figure 6:
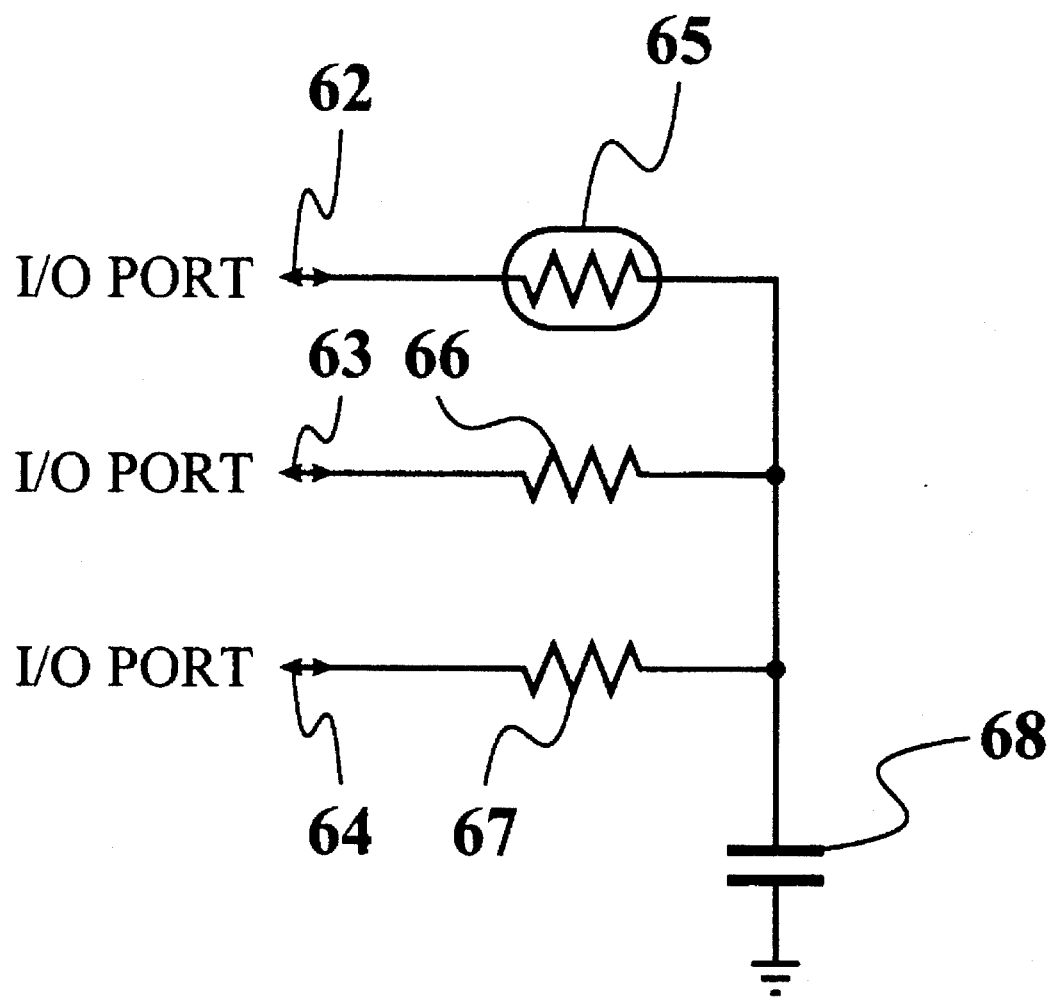
FIG. 6: Temperature or wind-chill Measurement Circuitry

The temperature or wind-chill measurement circuitry is shown in FIG. 6. Points 62, 63 and 64 are connected to separate I/O ports of the microcontroller. Resistor 65 is a negative thermal coefficient (NTC) resistor or thermistor (resistance rises with a decrease in temperature). Resistor 66 is a calibration resistor with a low tolerance value say one percent. Resistor 6 is used to discharge the capacitor 68. Operation of the circuit is as follows. First, I/O ports 62 and 63 are configured to be inputs and I/O port 64 is configure to be an output. Placing a logic "0" on point 64 discharges the capacitor 68 through resistor 67. After the capacitor is totally discharged I/O port 64 is flipped to be an input. Next, I/O port 63 is changed to an output with a logic "1" value. This starts to charge the capacitor 68 through resistor 66, the calibration resistor. During this charging the microcontroller counts in a tight loop while monitoring the input level at point 64. When the level at this point turns to a logic "1" counting is stopped and this value is saved. Again, the capacitor is discharged by the method described earlier. Then again I/O port 64 configured as an input and I/O port 62 is now configured as an output with a logic "1". The microcontroller now starts counting again until the charge on the capacitor 68 registers a logic "1" at point 64. Now, the count derived from resistor 65 is divided by the calibration count from resistor 66 and multiplied by the value of the calibration resistor. The result is the thermistor 65 resistance value which is directly related to temperature. Hence, the temperature is measured. To measure wind-chill the thermistor is place near a heat source.

The algorithm by which the microprocessor controls the power supply is open to very many possibilities so that a detailed description will not be provided here. It will be appreciated however that the microprocessor can be programmed to accommodate new power saving schemes or to tailor the control system to the particular requirements of a particular customer.

However one important control function which generates significant power savings is that of providing a duty cycle so that power is supplied to each individual outlet only over a portion of a cycle time. In many arrangements of this type, power is supplied for periods only of one third of each cycle thus reducing the total power usage to one third of that which would be otherwise required. This proportion can of course be varied in dependence upon temperatures as measured including reducing the portion to zero above a predetermined maximum temperature. In many arrangements, the system is only concerned with total power usage so that it is not important whether all of the units supply power simultaneously or whether they are arranged at different portions of the cycle time.

However some systems require a reduction in the maximum demand since some utilities utilize this factor in calculating power usage rates. If it is desired therefore to reduce the maximum demand, it is of course desirable that, of all the outlets in the system only a portion of them are supplying power at any one time during the cycle. In a one third duty cycle, therefore, it will be desirable to arrange the outlet so that only one third are applying power during a first part of the duty cycle, a second third supply power during a second part of the cycle and a third portion supply power during a third part of the cycle. As the control unit are in effect independent and not controlled by the central control unit, it is necessary therefore to supply a scheme by which this can be achieved. In a first alternative arrangement, therefore, the individual control elements are programmed with that part of the cycle within which they are allowed to supply power. All of the units are then initialized at an initial time by detecting an initial power-up of the system. The units are then generally maintained in synchronism by the cycles of the power supply. However, "brown-outs" can interfere with this synchronism and therefore it is desirable to re-initialize the control elements on a regular basis.

In an alternative scheme, there is no attempt to synchronize the control elements and instead the control elements supply power to a portion of the cycle with that cycle commencing at the time of first application of the load. As the application of the load is effectively a random event, as the control units utilize the same cycle time, the commencement of the cycles for each of the units will remain random so that the location of the portion of time within that cycle time will itself be random.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Apparatus for supplying electrical power to a plurality of electrical outlets comprising a central power supply, a plurality of outlet receptacles each for mounting at a respective one of a plurality of separate positions for supplying electrical power to a plurality of separate electrical loads, electrical wiring for communicating current from the central power supply to the receptacles in parallel, each receptacle having an outer casing and at least one electrical outlet socket mounted thereon for receiving a connector plug of a respective one of the electrical loads and means for controlling a supply of current from the central power supply to the electrical outlet sockets of the outlet receptacles connected thereto comprising a plurality of control elements, each mounted in a respective one of the receptacles and each associated with at least one of the electrical outlets of the respective receptacle; each control element comprising:

a reprogrammable microprocessor;

communicating means for communicating with the microprocessor from the exterior of the respective receptacle;

switch means operable by the microprocessor for selectively supplying power from the central power supply to said at least one electrical outlet;

detector means responsive to the insertion of a connector plug connected to one of said electrical loads into the respective outlet socket;

and comparison means actuated by said detector means for comparing a current drawn by the load with a predetermined maximum allowable current and for only allowing supply to the outlet in response to a current less than said predetermined maximum.

2. The apparatus according to claim 1 wherein each receptacle includes two of said outlet sockets and wherein there is provided a single one of said control elements arranged for controlling both of the outlet sockets and wherein said single one of said control elements is mounted on a support member for mounting in the respective receptacle, the support member having means thereon for supporting said two of said outlet sockets.

3. The apparatus according to claim 1 including a communication interface mounted at the central power supply and arranged to communicate through said electrical wiring to said communicating means of each of said control elements.

4. The apparatus according to claim 1 wherein the communicating means of each of said control elements is bi-directional for receiving data from and communicating data to the microprocessor.

5. The apparatus according to claim 1 wherein said detector means of the respective control element is arranged to communicate a point in time of insertion of a connector plug to the microprocessor of the respective control element and wherein the microprocessor of the respective control element is arranged to delay operation of said switch means of the respective control element for a period of time.

6. The apparatus according to claim 1 wherein each control element includes user display means for displaying to a user effecting said insertion of said connector plug a first signal responsive to operation of said switch means by said microprocessor and a second signal responsive to detection by said comparison means of a current greater than said predetermined maximum.

7. The apparatus according to claim 1 wherein said detector means is arranged to detect a point in time of insertion of a connector plug carrying a load and to communicate said point in time to said microprocessor so as to actuate said comparison means to effect a comparison of the load thereof for each new connector plug inserted.

8. The apparatus according to claim 1 wherein said comparison means is arranged to repeatedly compare the current drawn by a load during supply of power to the load and to cause said microprocessor to actuate said switch means for disconnecting the supply on detection of a current greater than said predetermined maximum.

9. The apparatus according to claim 1 wherein the microprocessor of each control element is arranged so as to vary said predetermined maximum allowable current.

10. The apparatus according to claim 9 wherein the comparison means comprises a window comparator.

11. The apparatus according to claim 1 wherein said detector means is arranged for detecting the presence and absence of a connector plug connected to one of said electrical loads inserted into the respective outlet socket such that detection of an absence followed by the detection of a presence is indicative of a new load, wherein the switch means comprises a solid-state contactor, wherein there is provided means for communicating to the microprocessor the point in time of zero crossings of the power supply and wherein the solid state contactor is actuated, on detecting by the detector means of a new load, at a point in time close to the zero crossing to limit current flow to the new load.

12. The apparatus according to claim 11 wherein said microprocessor is arranged such that, on a detection by said comparison means of a current greater than said predetermined maximum supplied to said new load, to cause said switch means to disconnect said supply to said outlet until the absence of a load is detected by said comparison means.

13. The apparatus according to claim 1 wherein the communicating means of each of said control elements is arranged for communicating a control algorithm to the microprocessor of the respective control element.

14. The apparatus according to claim 13 including a hand held communicating device movable manually from one receptacle to a next receptacle for communicating through said communicating means to the microprocessor of the respective control element of each receptacle in turn.

15. The apparatus according to claim 14 wherein the microprocessor is arranged so as to vary said predetermined maximum allowable current and wherein said hand held communicating device is arranged for communicating through said communicating means to the microprocessor a selected predetermined maximum allowable current.

16. The apparatus according to claim 1 wherein the microprocessor of each control element is arranged to control the switch means of the respective control element so as to supply power to the outlet socket of the respective control element during a predetermined cycle time period for a selected time period which is a proportion of the predetermined cycle time period.

17. The apparatus according to claim 16 wherein the microprocessor of each control element is arranged such that said predetermined cycle time period of the control element is commenced at a time of operation of the switch means by the microprocessor for supplying power from the central power supply to said at least one electrical outlet, wherein the control elements are arranged in a first and a second group with the control elements of said first group being arranged such that the selected time periods thereof lie at a different location in the predetermined cycle time period relative to the selected time periods of the control elements of said second group.

18. The apparatus according to claim 16 wherein the microprocessor of each control element is arranged such that said predetermined cycle time period of the respective control element commences at the time of connection of the connector plug to the electrical outlet socket of the respective control element and wherein said detector means of the respective control element is arranged to communicate a time of insertion of a connector plug to the microprocessor of the respective control element.

19. Apparatus for supplying electrical power to a plurality of electrical outlets comprising a central power supply, a plurality of outlet receptacles each for mounting at a respective one of a plurality of separate positions for supplying electrical power to a plurality of separate electrical loads, electrical wiring for communicating current from the central power supply to the receptacles in parallel, each receptacle having an outer casing and at least one electrical outlet socket mounted thereon for receiving a connector plug of a respective one of the electrical loads and means for controlling a supply of current from the central power supply to the electrical outlet sockets of the outlet receptacles connected thereto comprising a plurality of control elements, each mounted in a respective one of the receptacles and each associated with at least one of the electrical outlets of the respective receptacle; each control element comprising:

a reprogrammable microprocessor;

switch means operable by the microprocessor for selectively supplying power from the central power supply to said at least one electrical outlet;

detector means responsive to the insertion of a connector plug connected to one of said electrical loads into the respective outlet socket;

comparison means actuated by said detector means for comparing a current drawn by the load with a predetermined maximum allowable current and for only allowing supply to the outlet in response to a current less than said predetermined maximum;

and means for programming said microprocessor to vary said predetermined maximum allowable current.

20. Apparatus for supplying electrical power to a plurality of electrical outlets comprising a central power supply, a plurality of outlet receptacles each for mounting at a respective one of a plurality of separate positions for supplying electrical power to a plurality of separate electrical loads, electrical wiring for communicating current from the central power supply to the receptacles in parallel, each receptacle having an outer casing and at least one electrical outlet socket mounted thereon for receiving a connector plug of a respective one of the electrical loads and means for controlling a supply of current from the central power supply to the electrical outlet sockets of the outlet receptacles connected thereto comprising a plurality of control elements, each mounted in a respective one of the receptacles and each associated with at least one of the electrical outlets of the respective receptacle; each control element comprising:

a reprogrammable microprocessor;

switch means operable by the microprocessor for selectively supplying power from the central power supply to said at least one electrical outlet;

detector means responsive to the insertion of a connector plug connected to one of said electrical loads into the respective outlet socket, said detector means being arranged to detect a point in time of insertion of a connector plug carrying a load and to communicate said point in time to said microprocessor;

and comparison means actuated by said detector means for comparing a current drawn by the load with a predetermined maximum allowable current and for only allowing supply to the outlet in response to a current less than said predetermined maximum.

21. The apparatus according to claim 20 wherein said detector means is arranged for detecting the presence and absence of a connector plug connected to one of said electrical loads inserted into the respective outlet socket such that detection of an absence followed by the detection of a presence is indicative of a new load, wherein the switch means comprises a solid-state contactor, wherein there is provided means for communicating to the microprocessor the point in time of zero crossings of the power supply and wherein the solid state contactor is actuated, on detecting by the detector means of a new load, at a point in time close to the zero crossing to limit current flow to the new load.

* * * * *